R. C. KNOLL, F. J. RODE AND C. KOTCHI.
ELECTRODE FOR ARC WELDING.
APPLICATION FILED JAN. 3, 1920.
1,354,664.
Patented Oct. 5, 1920.
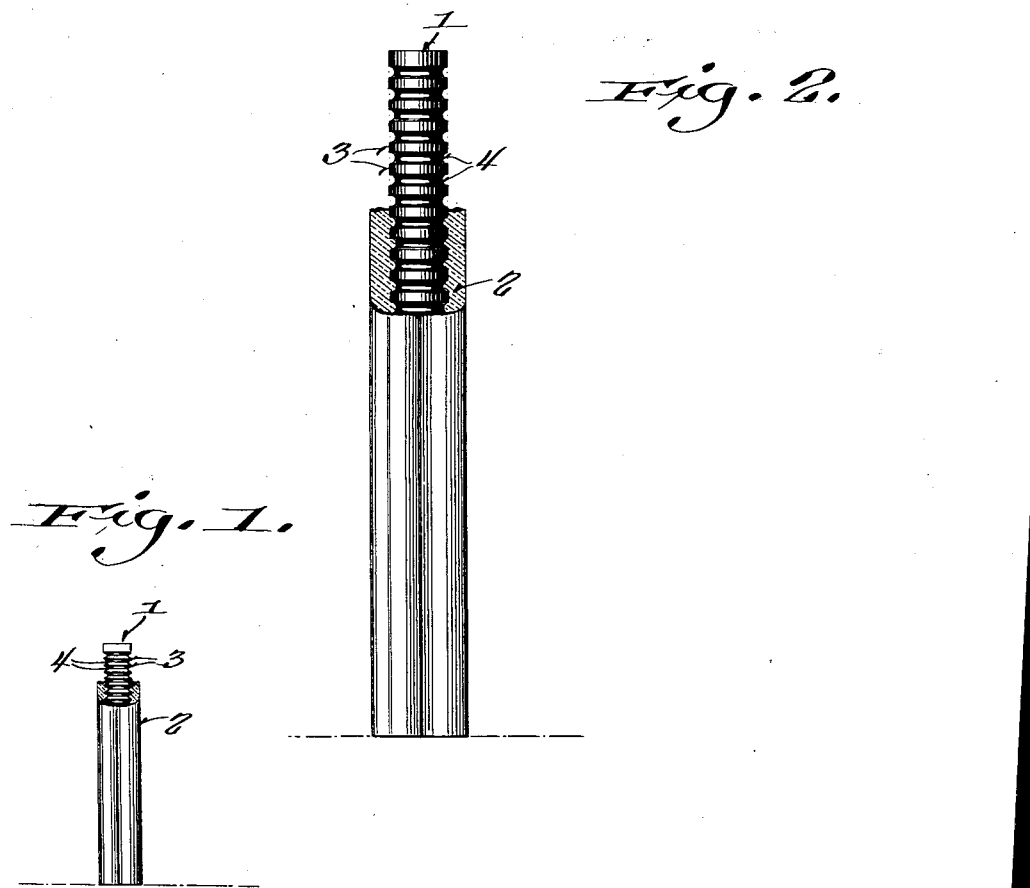
Inventors:
Roy C. Knoll
Frederick J. Rode
Charles Kotchi

UNITED STATES PATENT OFFICE.

ROY CARL KNOLL, FREDERICK JOHN RODE, AND CHARLES KOTCHI, OF MILWAUKEE, WISCONSIN.

ELECTRODE FOR ARC-WELDING.

1,354,664.

Specification of Letters Patent.  Patented Oct. 5, 1920.

Application filed January 3, 1920. Serial No. 349,152.

*To all whom it may concern:*

Be it known that we, ROY CARL KNOLL, FREDERICK JOHN RODE, and CHARLES KOTCHI, citizens of the United States, and residents of Milwaukee, in the county of Milwaukee and State of Wisconsin, have invented certain new and useful Improvements in Electrodes for Arc-Welding; and we do hereby declare that the following is a full, clear, and exact description thereof.

Our invention relates to new and useful improvements in electrodes for use in arc welding, and pertains particularly to that type of electrode which is fused by the heat of the electric arc, the molten metal thereof being deposited on and united with the parts to be welded.

It has been discovered that electrodes for this purpose operate more efficiently if the electric current is caused to travel around the surface of the metallic member thereof, the result being that the latter is regularly and uniformly fused. The heat due to the arcing is thus also evenly distributed from the outside to the center of the metallic portion of the electrode. In other words an electrode having means for causing the current to travel spirally therearound will work to much better advantage than one in which the current may pass in a substantially straight line.

We, however, have invented an electrode which is much more effective than either of the types just referred to, and it is our aim to not only cause the electric current to flow around the axis of the electrode, but also to successively jump from one portion to another.

The result of this is that the electrode will fuse at a lower temperature while at the same time producing a very hot arc, and the metallic core or rod of the electrode will be formed into minute pellets and projected from the end of the outer protective shell or covering against the work to be welded.

With the foregoing and other objects, and the obvious advantages thereof, in view, the invention consists in the novel features of construction, combination and arrangement of parts which will be hereinafter more particularly described and claimed and shown in the drawing wherein:

Figure 1 represents an elevational view, partly in section, of a portion of an arc welding electrode.

Fig. 2 is an enlarged or exaggerated view somewhat similar to Fig. 1.

Referring particularly to this drawing, it will be seen that the electrode consists primarily of a metallic core in the form of a rod 1 and a protective shell or covering 2. In carrying out the invention the core or rod 1 is provided throughout its length with a plurality of alternate ridges 3 and grooves 4, each ridge being annular and spaced from the next adjacent ridges by the intervening grooves 4. In other words each ridge is in the nature of a ring extending entirely around the rod 1 and being independent of each of the other similar ring-like ridges formed thereon.

In practice these ridges are relatively narrow and positioned very close together, Fig. 2 of the drawing being more or less exaggerated to particularly illustrate the principal feature of the invention. Also the ridges may be formed by cutting in any desired manner the grooves 4, but it is obvious that a like structure could be produced by making the ridges 3 of metallic rings independent of each other and of the rod and thereafter placing the same around the latter.

The covering 2 which is placed about the metallic rod 1 may be of any desired material and disposed thereon in any preferred manner, but in the present instance is represented as wood pulp or similar combustible material which will be charred by the flame of the electric arc and fall away in minute particles following fusing of the rod 1. The consumption of the rod 1 and the destruction of the covering thereof are progressive, the former being utilized at a slightly greater rate of speed than the latter is destroyed so that the covering provides a crater or crucible in which the rod 1 is fused and from which the molten metal is forcibly projected in minute pellets, the latter result being occasioned by the structure of the rod 1 and the manner of directing the current of electricity therearound. As shown in the drawing the covering 2 fills in the interstices between the ridges 3.

From the foregoing description taken in connection with the accompanying drawing, it will be evident that we have invented an extremely simple arc welding electrode which will be very much more efficient than similar articles at present in use. In addition to the modifications in structure already mentioned, it is obvious that various other changes may be made in the form and proportion of the parts of the device without departing from or sacrificing any of the advantages thereof.

We claim:

1. An electrode for use in arc welding consisting of a metallic rod having metallic rings thereon.

2. An electrode for use in arc welding consisting of a metallic rod having individual metallic rings thereon.

3. An electrode for use in arc welding consisting of a metallic rod having spaced individual metallic rings thereon.

4. An electrode for use in arc welding consisting of a metallic rod having metallic rings thereon, and a covering disposed around said rod.

5. An electrode for use in arc welding consisting of a metallic rod having annular grooves formed therein.

6. An electrode for use in arc welding consisting of a metallic rod having annular grooves formed therein, each of said grooves being independent and distinct from the others.

7. An electrode for use in arc welding consisting of a metallic rod having annular grooves formed therein, each of said grooves being independent and distinct from the others, and a covering disposed around said rod.

8. An electrode for use in arc welding consisting of a metallic rod having annular grooves formed therein, each of said grooves being independent and distinct from the others, and a covering surrounding the rod and disposed in said grooves.

In testimony that we claim the foregoing we have hereunto set our hands at Milwaukee, in the county of Milwaukee and State of Wisconsin.

ROY CARL KNOLL.
FREDERICK JOHN RODE.
CHARLES KOTCHI.